US009531839B1

(12) United States Patent
Wang et al.

(10) Patent No.: US 9,531,839 B1
(45) Date of Patent: Dec. 27, 2016

(54) SYSTEMS AND METHODS FOR REQUEST ISOLATION PROTECTION (71) Applicant: Google Inc., Mountainview, CA (US)

(72) Inventors: Jue Wang, Redmond, WA (US); Daniel Hill, Kirkland, WA (US); Scott Gasch, Mountainview, CA (US)

(73) Assignee: Google Inc., Mountain View, CA (US)

( * ) Notice: Subject to any disclaimer, the term of this patent is extended or adjusted under 35 U.S.C. 154(b) by 283 days.

(21) Appl. No.: 14/249,804

(22) Filed: Apr. 10, 2014

(51) Int. Cl.
*H04L 29/06* (2006.01)
*H04L 29/08* (2006.01)
*G06F 17/30* (2006.01)

(52) U.S. Cl.
CPC ......... *H04L 67/42* (2013.01); *G06F 17/30861* (2013.01); *H04L 67/02* (2013.01)

(58) Field of Classification Search
CPC .. H04L 67/02; H04L 67/1004; H04L 67/1014; G06F 17/30; G06F 17/30861
See application file for complete search history.

(56) References Cited

U.S. PATENT DOCUMENTS

| | | | |
|---|---|---|---|
| 6,401,099 B1 | 6/2002 | Koppolu et al. | |
| 6,917,976 B1 | 7/2005 | Slaughter et al. | |
| 7,117,504 B2 | 10/2006 | Smith et al. | |
| 7,770,188 B2 | 8/2010 | Jones et al. | |
| 8,219,684 B1 * | 7/2012 | Dean | G06F 9/5027 709/203 |
| 8,516,080 B2 | 8/2013 | Chow et al. | |
| 9,197,695 B2 * | 11/2015 | Dean | G06F 9/5027 |
| 2003/0167355 A1 | 9/2003 | Smith et al. | |
| 2004/0148339 A1 * | 7/2004 | Forslund | G06F 17/30902 709/203 |
| 2004/0255048 A1 | 12/2004 | Lev Ran et al. | |
| 2005/0038861 A1 * | 2/2005 | Lynn | G06Q 10/107 709/206 |
| 2005/0203890 A1 * | 9/2005 | Chen | G06F 17/3056 |
| 2006/0021004 A1 * | 1/2006 | Moran | H04L 63/08 726/2 |
| 2006/0122883 A1 * | 6/2006 | Lynn | G06Q 30/02 705/14.46 |
| 2006/0206903 A1 | 9/2006 | Lawrence et al. | |
| 2007/0116284 A1 * | 5/2007 | Esclamada | G06Q 10/107 380/255 |
| 2008/0301290 A1 * | 12/2008 | Ahmed | H03M 7/30 709/224 |
| 2009/0234904 A1 * | 9/2009 | Dalgliesh | G06F 17/30489 709/201 |
| 2012/0054765 A1 * | 3/2012 | Lee | G06F 9/5027 718/104 |

(Continued)

*Primary Examiner* — Lashonda Jacobs (74) *Attorney, Agent, or Firm* — Fish & Richardson P.C.

(57) ABSTRACT

Systems and methods for request isolation protection at a first server. The first server receives a resource request from a client device. The first server may receive multiple requests from the same client device or other client devices. The first server caches the multiple requests so that only one resource request is made to a second server storing the resource. The first server detects when the client device cancels the request to the resource. In response, the first server cancels the request made to the second server if there are no other requests made to the resource. If there are other requests remaining, then the first server does not cancel the request to the second server.

20 Claims, 5 Drawing Sheets

(56) References Cited

U.S. PATENT DOCUMENTS

2012/0084347 A1* 4/2012 Fay .................... H04L 67/2842
709/203
2012/0143992 A1* 6/2012 Salamatov ............ G06F 9/5027
709/219

* cited by examiner

SYSTEMS AND METHODS FOR REQUEST ISOLATION PROTECTION

BACKGROUND

In a network, a client device may request a resource from a first server. The server may need to request the resource, in turn, from a second server. The same resource may be requested multiple times before it is received. When this occurs, system performance may suffer as the second server attempts to service multiple resource requests for the same resource.

SUMMARY

One implementation of the present disclosure is a computer-implemented method for request isolation protection. The method comprises receiving, at a first server, a first request for a resource stored in a second server, the first request sent from a client device comprising a user interface, and transmitting the first request for the resource to the second server. The method further comprises storing, in a first data structure stored in a memory element provided by the first server, an entry identifying the client device and including a reference to an entry of a second data structure and storing, in the referenced entry in the second data structure stored in the memory element, an entry including an identifier of the transmitted request and a reference count. The method further comprises receiving, at the first server, a cancellation of the first request, the cancellation sent from the client device and detected by the user interface, and decrementing the reference count of the referenced entry. The method further comprises detecting that the reference count equals zero, and cancelling the transmitted request.

Another implementation of the present disclosure is a system for request isolation protection. The system comprises a second server storing a resource and a first server. The first server comprises a receiver receiving a first request for the resource, the first request sent from a client device comprising a user interface and a transmitter transmitting the first request for the resource to the second server. The first server also comprises a memory element storing a first data structure comprising an entry identifying the client device and including a reference to an entry of a second data structure and a second data structure comprising the referenced entry comprising an identifier of the transmitted request, and a reference count. The first server further comprises a detector receiving a cancellation of the first request, the cancellation sent from the client device and detected by the user interface. The first server further comprises a controller, connected to the memory element, decrementing the reference count of the referenced entry in the second data structure, detecting that the reference count equals zero, and cancelling the transmitted request.

BRIEF DESCRIPTION OF THE DRAWINGS

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

The details of one or more implementations are set forth in the accompanying drawings and the description below.

Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Referring generally to the figures, systems and methods for request isolation protection are shown, according to described implementations. The systems and methods described herein may be used by a first server to protect a second server from being flooded with redundant or expensive requests. The systems and methods described herein may be used by a first server and a second server to protect a third server from being flooded with redundant or expensive requests. Multiple requests for a same resource in the second server may be isolated so that only one request to the second server is made. In operation, the first server in accordance with the present disclosure receives a request for a resource stored in a second server. If a request for the resource has not been sent before, the first server transmits a request for the resource to the second server. The request to the second server is asynchronous and may be cancelled. The first server receives additional requests for the resource, but does not transmit additional requests for the resource to the second server. The first server may detect that every request for the resource has been cancelled prior to receiving a response from the second server. In response, the first server cancels the transmitted request to the second server.

A client device can view a resource, such as a web page, a document, an application, etc. The resource may reference or include additional resources, such as text, image, animation, video, and/or audio information. For instance, a client device using a web browser can browse to a web page that contains an image. Specifically, the web page may include a uniform resource locator (URL) that identifies a first server as hosting the image. The client device may request the resource from a first server. The client device may use an application (e.g., a web browser, a video game, a chat program, a mobile application, etc.) to request the resource. The first server may transmit the request to a second server that is a second server. The second server retrieves the stored resources and sends it to the first server. The first server sends the resource to the client device.

In some instances, a web page or other resource (such as, for instance, an application) includes one or more third-party content item slots. Third-party content items may be resources or content that are displayed on a resource hosted by a first party. For instance, an advertisement that is displayed on a web page may be a third-party content item. Content items may be selected and served for display with the resource. The resource may include code (e.g., JavaScript®, HTML, etc.) defining a content item slot for a web page or other resource. The code may include instructions to request a third-party content item from a content item selection system to be presented with the web page. In some implementations, the code may include an image request having a content item request URL that may include one or more parameters. After the content item is selected, the client device may request the content item from a first server.

Figure 1:
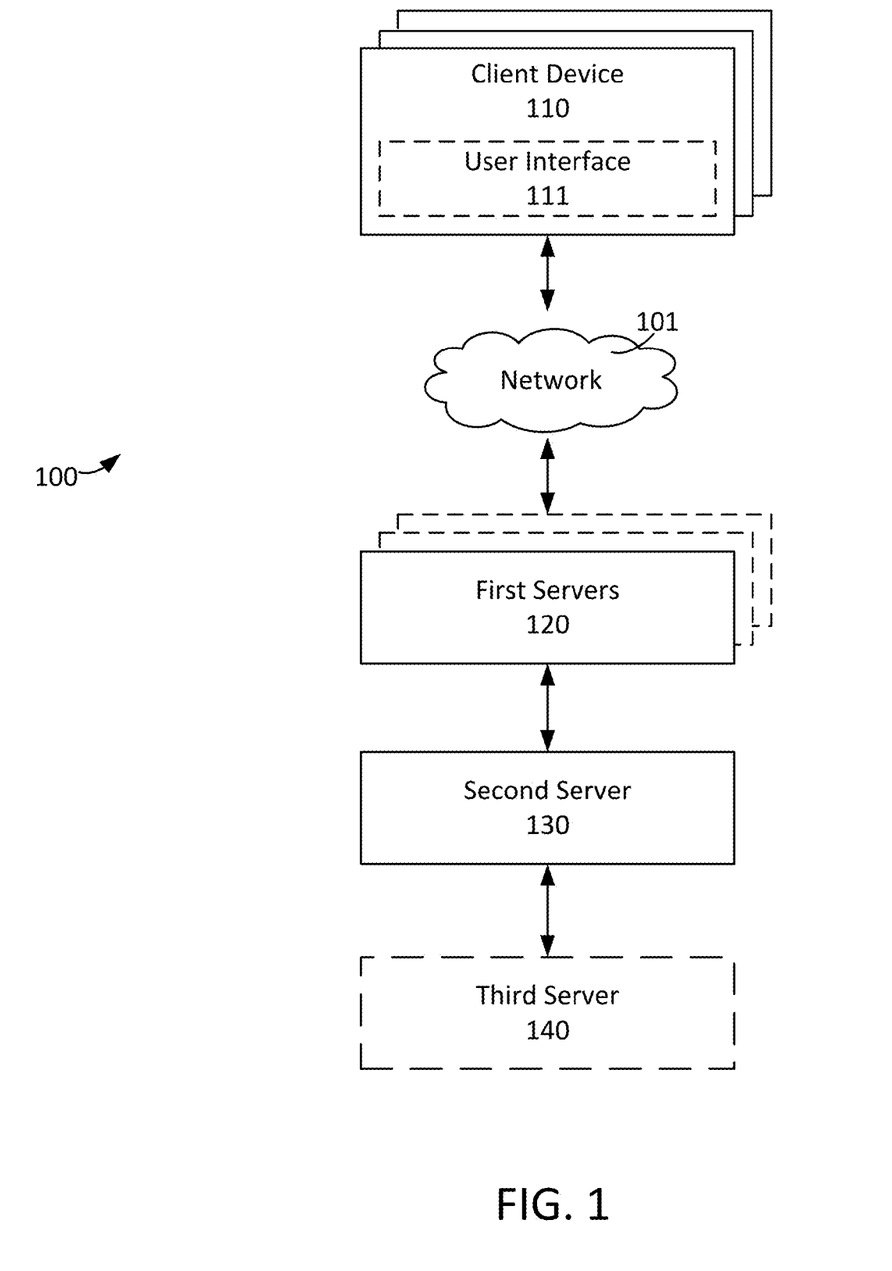
FIG. 1 is a block diagram of a computer system including a network, client devices, first server, and second server, according to a described implementation.

FIG. 1 is a block diagram of a computer system 100 including a network 101, client device 110, first server 120, second server 130, and optional third server 140. The system 100 may use at least one computer network such as the network 101. The network 101 may include a local area network (LAN), wide area network (WAN), a telephone network, such as the Public Switched Telephone Network (PSTN), a wireless link, an intranet, the Internet, or combinations thereof. For instance, the client device 110 may be connected to the first server 120 through the Internet, and the first server 120 and the second server 130 may be connected through a WAN.

Client device 110 may be any number and/or type of user-operable electronic devices. For instance, client device 110 may include a desktop computer, laptop, smart phone, wearable device, optical head-mounted display, smart watch, tablet, personal digital assistant, set-top box for a television set, smart television, gaming console device, mobile communication devices, remote workstations, client terminals, entertainment consoles, or any other devices configured to communicate with other devices via the network 101. The computer system 100 may include one or more client devices 110. A client device 110 may be capable of receiving resources from a first server 120. The client device 110 may be any form of electronic device that includes a data processor and a memory. The memory may store machine instructions that, when executed by a processor, cause the processor to request a resource, load the resource, and request a content item. The memory may also store data to effect presentation of one or more resources, content items, etc. on the client device 110. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, digital versatile disc (DVD), Blu-ray disc, magnetic disk, memory chip, read-only memory (ROM), random-access memory (RAM), Electrically Erasable Programmable Read-Only Memory (EE-PROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 110 can execute a software application (e.g., a web browser or other application) to request a resource from other devices over the network 101 or over a direct connection. Client device 110 may execute client-side scripts or applications configured to retrieve a resource from a resource server 120. In some implementations, the client device 110 may programmatically generate the request. In some implementations, a user may generated the request. Client device 110 may include a user interface 111 which may include hardware and software components for presenting resource to a user and receiving user input. The hardware components may be an electronic display, a touchscreen, a speaker, a keyboard, a mouse, a microphone, a printer, etc. The user interface 111 may include software component or application (e.g., a web browser, a resource renderer, etc.) for converting electronic resource into a user-comprehensible format (e.g., visual, aural, graphical, etc.). A software component or application on the client device 110 may act as a user agent to allow a user to view HTML encoded content. For instance, the client device 110 may execute a web browser application which provides a browser window on a display of the client device 110. The web browser application that provides the browser window may operate by receiving input of a uniform resource locator (URL), such as a web address, from an input device (e.g., a pointing device, a keyboard, a touch screen, or another form of input device) or from a memory element. In response, one or more processors of the client device 110 executing the instructions from the web browser application may request data from another device connected to the network 101 referred to by the URL address (e.g., a first server 120). The device receiving the request may then provide web page data and/or other data to the client device 110, which causes visual indicia to be displayed by the display of the client device 110. Accordingly, the browser window displays the retrieved resource, such as web pages from various websites. Client devices 110 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a resource.

In some implementations, client device 110 is capable of receiving user input through the user interface 111. In receiving a user input, the client device 110 may generate a variety of user actions in response to a user input. The user action may include, for instance, refreshing or reloading a web page, closing an application, closing a tab of a web browser, closing a resource viewer, opening another resource viewer, etc. Client device 110 may generate user actions when particular actions are performed by a client device 110. The user actions generated by client devices 110 may be communicated to a first server 120.

The first server 120 may be any number and/or type of electronic devices. For instance, first server 120 may include a server, desktop computer, laptop, smart phone, wearable device, optical head-mounted display, smart watch, tablet, personal digital assistant, set-top box for a television set, smart television, gaming console device, mobile communication devices, remote workstations, client terminals, entertainment consoles, data processing system, computer device, or any other devices configured to communicate with other devices via the network 101. The computer system 100 may comprise one or more first servers 120. A first server 120 can include at least one logic device, such as a computing device having a data processor, to communicate via the network 101, for instance with client device 110, the second server 130 and the third server 140. One or more processors may be configured to execute instructions stored in a memory device to perform one or more operations described herein. In other words, the one or more data processors and the memory device of the first server 120 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, digital versatile disc (DVD), Blu-ray disc, magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions to effect request isolation protection. The processor may also process instructions to receive requests for a resource stored in a second server 130 via the network 101 and to provide a resource from the second server 130 to the client device 110. In addition to the processing circuit, the first server 120 may include one or more configured to store data. First server 120 may receive requests for resources stored in the second server 130. First server 120 may execute frontend scripts or applications that may, for instance, provide user interface and detect user actions. First server 120 may be configured to provide user interface instructions to the client device 110 and receive or detect user actions from the client device 110 or the user interface 111. In some implementations, one first server 120 may be connected to a plurality of second servers 130 such that the first server 120 may act as a cache or a resource manager for the resources stored in the plurality of second servers 130. The first server 120 is described in greater detail in relation to FIG. 3.

The second server 130 may be any number and/or type of electronic devices. For instance, second server 130 may include a server, desktop computer, laptop, smart phone, wearable device, optical head-mounted display, smart watch, tablet, personal digital assistant, set-top box for a television set, smart television, gaming console device, mobile communication devices, remote workstations, client terminals, entertainment consoles, data processing system, a computing device, or any other devices configured to communicate with other devices via the network 101. The computer system 100 may comprise one or more second servers 130. The second server 130 may be configured to provide a resource. The computer system 100 may comprise one or more second servers 130. Second server 130 may store the resource or request the resource from a third server 140. Second server 130 may directly or indirectly provide resource to the client device 110, first server 120, and/or to other devices via network 101. The second server 130 may be a computer server (e.g., a file transfer protocol (FTP) server, file sharing server, web server, etc.), or a combination of servers (e.g., a data center, a cloud computing platform, etc.). In some implementations, the second server 130 may include at least one logic device, such as a computing device having a data processor, to communicate via the network 101, for instance with a first server 120 or a third server 140. In some implementations, second server 130 may be any type of memory device capable of storing resources. Second server 130 may include any type of non-volatile memory, media, or memory devices. For instance, second server 130 may include semiconductor memory devices (e.g., EPROM, EEPROM, flash memory devices, etc.) magnetic disks (e.g., internal hard disks, removable disks, etc.), magneto-optical disks, and/or DVD-ROM and Blu-ray disks.

The third server 140 can be any number and/or type of electronic devices. For instance, third server 140 may include a server, desktop computer, laptop, smart phone, wearable device, optical head-mounted display, smart watch, tablet, personal digital assistant, set-top box for a television set, smart television, gaming console device, mobile communication devices, remote workstations, client terminals, entertainment consoles, data processing system, a computing device, or any other devices configured to communicate with other devices via the network 101. The computer system 100 may comprise one or more third servers 140. The third server 140 may be configured to store a resource. The third server 140 may be configured to host a resource, such as a web page or other resource (e.g., articles, comment threads, music, video, graphics, search results, information feeds, etc.). The third server 140 may be a computer server (e.g., a file transfer protocol (FTP) server, file sharing server, web server, etc.) or a combination of servers (e.g., a data center, a cloud computing platform, etc.). In some implementations, third server 140 may be any type of memory device capable of storing resources. Third server 140 may include any type of non-volatile memory, media, or memory devices. For instance, third server 140 may include semiconductor memory devices (e.g., EPROM, EEPROM, flash memory devices, etc.) magnetic disks (e.g., internal hard disks, removable disks, etc.), magneto-optical disks, and/or DVD-ROM and Blu-ray disks.

In implementations that does not have the third server 140, the second server 130 may store the resource and the first server 120 may detect or receive cancellation from the client device 110. In such implementations, the first server 120 stores a first and a second data structures discussed in relation to FIG. 3. In some implementation, the third server 140 may store the resource, and the first server 120 may detect or receive cancellation from the client device 110. In such implementations, the second server 130 may store the first and the second data structures discussed in relation to FIG. 3. One or more first servers 120 may connect to a second server 130.

The resources that are stored in the second server 130 or the third server 140 may include any type of information or data structure that can be provided over network 101. In some implementations, resources may be identified by a resource address associated with the first server 120 (e.g., a URL). Resources may include web pages (e.g., HTML web pages, PHP web pages, etc.), word processing documents, portable document format (PDF) documents, images, video, programming elements, interactive content, streaming video/audio sources, or other types of electronic information. Resources provided by the first server 120 may be web pages, local resources, intranet resources, Internet resources, or other network resources. In some implementations, resources include one or more web pages to which client devices 110 are directed (e.g., via an embedded hyperlink). The resources may be a content item that is in any format that may be presented on a display of a client device 110, for instance, graphical, text, image, audio, video, etc. The resource or the content item may be a combination or hybrid of the formats. The resources or content items may be banner content items, interstitial content items, pop-up content items, rich media content items, hybrid content items, Flash® content items, cross-domain iframe content items, etc. The resources or content items may also include embedded information such as hyperlinks, metadata, links, machine-executable instructions, annotations, etc.

Figure 2:
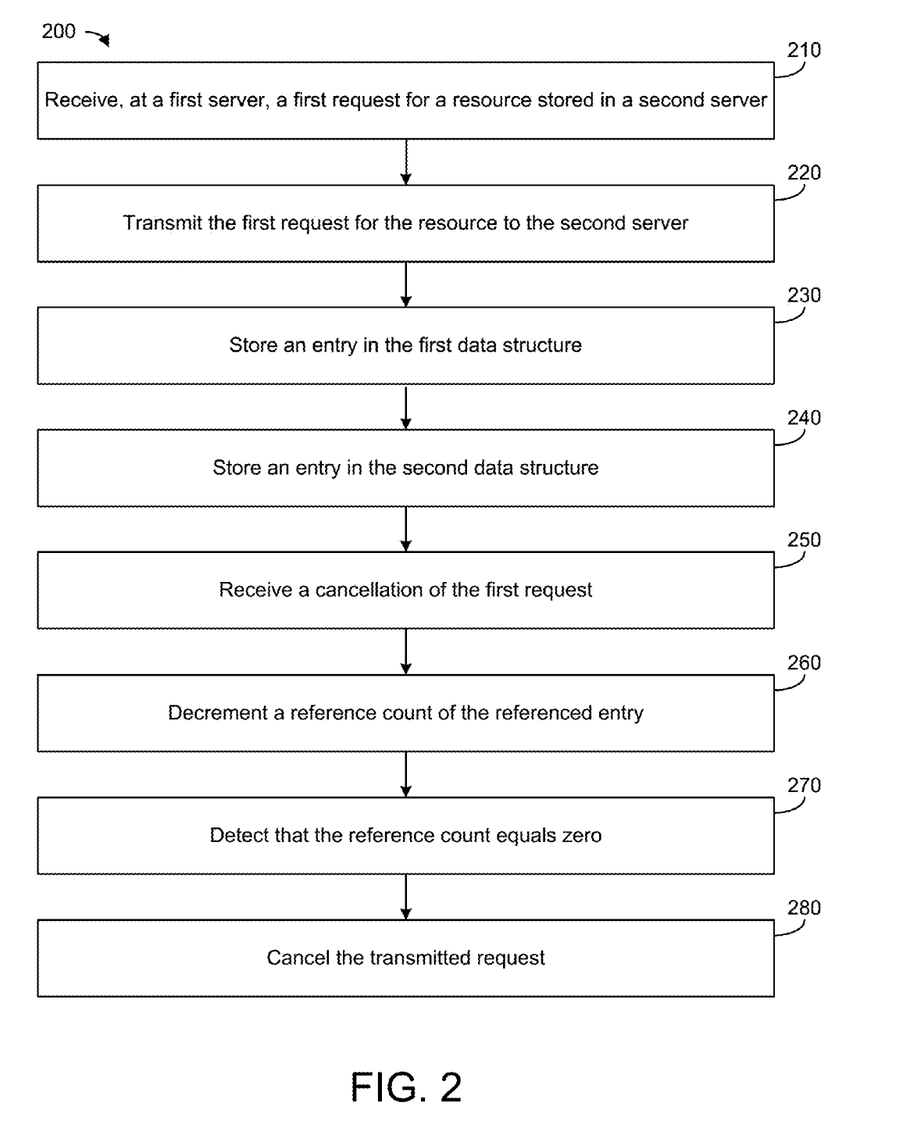
FIG. 2 is a flowchart of an implementation of a process for request isolation protection.

FIG. 2 is a flowchart of an implementation of a process for request isolation protection. In brief overview, the method generally includes receiving, at a first server, a first request for a resource stored in a second server (step 210), transmitting the first request for the resource to the second server (step 220), storing an entry in the first data structure (step 230), and storing an entry in the second data structure (step 240). The method also includes receiving a cancellation of the first request (step 250), decrementing a reference count of the referenced entry (step 260), detecting that the reference count equals zero (step 270), and cancelling the transmitted request (step 280). In other implementations, these steps can be performed in a different order.

Specifically, the method includes receiving, at a first server, a first request for a resource stored in a second server (step 210). The request may be sent from a client device 110. In some implementations, the request may be programmatically generated. In some implementations, the request may be generated by the user of the client device 110. The client device 110 may comprise a user interface 111, such as a web browser, that sends a request to the first server 120. The resource may be any type of resource such as text, image, animation, video, and/or audio information. The request for a resource may be in a form of URL.

In some implementations, the first request comprises a client device identifier. For instance, the request may include a header that comprises Internet Protocol (IP) address of the client device 110. In another instance, the request may include a other information that identifies the client device 110 from different layers of the TCP/IP protocols. In some implementations, information identifying the client device 110 is received as part of the request or stored in the first server 120. For instance, a session identifier may be used as the client device identifier or to generate the client device identifier. In some implementations, the client device identifier may be generated from information received as part of the request or stored in the first server 120. For instance, the IP address of the client device 110 may be used to generate a client identifier. For instance, a client identifier may be generated from the IP address or other information. A hash function may be used to generate a client identifier. For instance, information from the first request may be used as an input or a seed value to the hash function, and the output may be used as a client device identifier. In another instance, an instantiation or a reference to the first request may be used to generate a client device identifier. In some implementations, the first request may comprise a first request identifier. The first request identifier may be the client device identifier, or derived from the request or from information stored in the first server 120. For instance, the time the request was received may be used to generate the first request identifier. The first request identifier or the client identifier may be a unique identifier that is generated and managed by a data manager.

The method further includes transmitting the first request for the resource to the second server (step 220). In some implementations, the transmitted request may be an inter-process communication. For instance, the transmitted request may be a remote procedure call (RPC). In some implementations, the transmitted request is a second request to the second server 130 for the resource, the second request sent from the first server 120 to the second server 130. The transmitted request may be cancelled by the first server 120. In some implementations, the first request may be transmitted to the second server 130 in a batch process. For instance, the first request may transmitted when another request for the same resource is received. In another instance, the first request may be transmitted with requests for other resources.

The first server 120 may keep a transmitted request identifier, which may be a reference or a unique identifier number. The first server 120 may use the transmitted request identifier to determine whether the second server 130 has responded to the transmitted request. The transmitted request may be non-blocking such that the first server 120 does not wait for a response from the second server 130. For instance, the request may be asynchronous. In some implementations, the transmitted request identifier is associated with an asynchronous computation unit representing a future response from the second server 130. The asynchronous computation unit may be, for instance, an instantiation of an implementation of a future interface in Java®. The asynchronous computation unit may wrap a future response from the second server 130. In some implementations, the first server 120 may be notified when a response is received from the second server 130. For instance, the transmitted request may comprise a callback function that is called when the second server 130 returns a response. The response may be a resource that was requested, or an error message. The error message may specify, for instance, that the resource was not found.

The method further includes storing an entry in the first data structure (step 230). The first data structure may be a table, a map, a vector, a list, etc. The first data structure is stored in a memory element provided by the first server 120. In some implementations, the entry in the first data structure identifies the client device 110. For instance, the entry may include the client device identifier discussed above. In some implementations, the entry identifies the first request. For instance, the entry includes the first request identifier generated from the first request. In some instances, the entry includes both the client identifier and the request identifier. The entry may also include a reference to an entry of a second data structure.

In some implementations, the reference to the entry of a first data structure is first filled with the client device identifier or the first request identifier, then an empty entry in the second data structure is selected. The reference to the empty entry in the second data structure is then stored in the entry of the first data structure. In some implementations, the reference to the entry in the first data structure is filled after storing an entry in the second data structure (step 240). In some implementations, the client identifier or the first request identifier of the entry in the first data structure may be filled before transmitting the first request (step 220).

The method further includes storing an entry in the second data structure (step 240). The second data structure may be a table, a map, a vector, a list, etc. The entry in the second data structure includes an identifier of the transmitted request, which may be a reference to a instantiation of a class or an interface implementation that sends a request to the second server 130 for the resource. For instance, the identifier of the transmitted request may be a reference to the asynchronous computation unit that wraps the future response from the second server 130. The identifier of the transmitted request may also be a unique identifier generated and managed by the data manager. The entry in the second data structure may also include a reference count, which may be an integer value. The reference count may be set to one when the entry in the second data structure is initialized. When an entry in the first data structure references an entry in the second data structure, a reference count in the entry in the second data structure is incremented. The reference count may be decremented when an entry in the first data structure that references the respective entry in the second data structure is deleted or references another entry in the second data structure. In some implementations, the reference count equals the number of requests for the resource that is received by the first server 120 from any number of client devices 110. In some implementations, the reference count equals the number of client devices 110 requesting the resource, such that a reload request does not increment the reference count. In some implementations, the reference count equals the number of applications on any number of client devices 110 that are requesting the resource, such that one client device 110 may concurrently execute multiple applications that each request the resource. In some implementations, the entry in the second data structure may contain a smart pointer. For instance, the smart pointer may contain the reference count as part of its implementation. The reference count may be managed by a data manager.

The first and second data structures may be implemented in different data structures. In one implementation, the first and second data structure may a multimap. The multimap may be implemented as tables, maps, vectors, lists, etc. In some implementations, the second data structures may be stored as a cache. A resource identifier may be used to index into the cache, or otherwise be used as a key of an entry in the cache, while the value of an entry in the cache may be the identifier of the transmitted request. The first and second data structures may be managed by a data manager.

In some implementations, a second data structure is searched for an entry containing a transmitted request for the resource in the second server 130. For instance, if an earlier request for the resource was received, an entry in the second data structure may already exist that references a transmitted request to the second server 130 for the resource. A different client device 110 may have requested for the same resource before the first request, or a different application in the same client device 110 may have requested for the same resource before the first request. In such instances, a request is not transmitted to the second server 130 responsive to receiving the first request (step 220). However, if no entry in the second data structure is found that requests the resource from the second server 130, the first request is transmitted to the second server 130. A reference count associated with the existing entry in the second data structure may be incremented.

In some instances, the second server 130 may return a response to the first server 120 before the first server 120 receives a cancellation of the first request. The first server 120 may receive the response from the second server 130. If the response contains the requested resource, the first server 120 may forward the resource to one or more client devices 110 that have requested the resource. The first server 120 may find the entry in the second data structure that comprises the transmitted request identifier that corresponds to the transmitted request for the resource. The first server 120 determines each client device identifier stored in an entry of the first data structure that references the entry in the second data structure. The first server 120 then forwards the resource and forwards it to each of the determined client devices 110. In some implementations, the resource is kept in the second data structure for a set amount of time before it is deleted. In such implementations, the second data structure may be a cache of resources stored in the second server 130. The first server 120 may decide whether to keep the resource in the second data structure after forwarding the resource to each client device 110 that has requested the resource. If the decision is made to not keep the resource, the resource and the entry in the second data structure are deleted. If the decision is made to keep the resource, the resource and the entry in the second data structure are deleted after an expiration of a set amount of time. In some implementations, all resources are kept for a predetermined amount of time. For instance, the amount of time is set by a system administrator. In some implementations, the decision to keep the resource and the amount of time may both be based on the freshness requirement of the resource, size of the request, predicted popularity of the resource, and load on the second server 130. The freshness requirement associated with the resource may indicate the amount of time before the resource should be requested from the second server 130 again to ensure that it is up-to-date. The size of the request may measure how expensive the transmitted request may be to the second server 130. The size of the request may be estimated by the size in of the resource in memory. In some implementations, the size of the request may also be a maximum reference count times the size of the resource. The maximum reference count may be highest number that the reference count has been before requests were cancelled or the resource was forwarded to the client devices 110. The predicted popularity of the requested resource may be based on historical data of requests for the resource. A probability distribution function may be used to calculate the probability that the resource will be requested again within a set amount of time. The amount of load on the second server 130 may measure the number of connections currently open, bandwidth, memory, processor cycles, or any other computing resource metric. In some implementation, the amount of load on the first or the third server 140 may be used instead.

The method may further include receiving a cancellation of the first request (step 250). The cancellation is sent from the client device 110 and may be detected by the user interface 111 on the client device 110. In some implementations, client-side code executed on the client device 110 may detect the cancellation of the request. In some implementations, server-side code executed on the first server 120 may detect the cancellation of the request. The cancellation of the request may be an explicit user action, such as the user pressing a "stop loading this page" button on a web browser, pressing a stop button on a video or audio playback application, or closing a dialog window. The cancellation may be implicit or inferred from user action, such as when the user closes a tab or a web browser that is requesting the resource. A cancellation may also be inferred when the user navigates away from the resource. In some instances, the cancellation may be inferred from an action by the client device 110, such as the web browser or an operating system on the client device 110 crashing, resetting, or exiting without user input.

In some implementations, an implicit cancellation of the first request may be a reload request. The client device 110 or the application on the client device 110 may request the first server 120 to reload the resource. The first server 120 receives the reload request and infers that the first request may be cancelled. In some implementations, a received request may be inferred to be the reload request by searching the first data structure for an entry containing the client device identifier or the request identifier. For instance, a request identifier for the reload request will be equivalent to a request identifier in an entry of the first data structure if a same session identifier is used to generate both request identifiers. In some implementations, the first server 120 may delete the entry in the first data structure that was added for the first request. The first server 120 may then add an entry in the first data structure for the reload request. In some implementations, the first server 120 may update the entry in the first data structure. For instance, the entry in the first data structure is updated with the reload request identifier. In some implementations, the entry in the first data structure may not need to be updated if it only contains the client identifier. In some implementations, after receiving the reload request, the method may conclude, and the transmitted request is not cancelled.

The method may further include decrementing the reference count of the referenced entry (step 260). The referenced entry is stored in the second data structure. The entry in the first data structure may be also deleted. In some implementations, deleting the entry in the first data structure triggers the reference count in the referenced entry to be decremented. In some implementations, the data manager decrements the reference count in response to deleting the entry in the first data structure. The method further includes detecting that the reference count equals zero (step 270). In some implementations, the reference count may equal zero when all client device requests for the resource may have been cancelled.

The method may further include cancelling the transmitted request (step 280). The transmitted request may be cancelled by using the transmitted request identifier in the entry in the second data structure. In some implementations, the method includes determining whether the second server 130 has responded to the transmitted request, and cancelling the transmitted request if the transmitted request is still in progress or the second server 130 has not yet responded. The entry in the second data structure may be deleted. In some implementations, the transmitted request is not cancelled until an expiration of a set amount of time. In some implementations, the amount of time may be predetermined. In some implementations, the amount of time is calculated based on the freshness requirement associated with the resource, size of the request, predicted popularity of the resource, and load on the second server 130.

Before the expiration of the set amount of time and before the transmitted request is cancelled, the first server 120 may receive a second request for the resource. The second request may be from the same or different client device 110 that sent the first request. If the second request was sent from a second client device 110, the second client device 110 comprises a user interface 111. The first server 120 may then search the first data structure for an entry with a client device identifier or a request identifier that matches the second request. When no entry in the first data structure is found, the second data structure may be searched to find the entry with a transmitted request identifier. The reference count of the entry in the second data structure is incremented to a value of one. A new entry in the first data structure may be stored. The new entry may contain the second client device identifier, the second request identifier, and a reference to the entry in the second data structure. The first server 120 may receive a cancellation of the second request, where the cancellation may be sent from the second client device 110. The reference count of the second table entry is decremented, the reference count of the second table entry is detected to be zero, and the transmitted request is cancelled after a set amount of time. The amount of time may be the same or recalculated based on the freshness requirement associated with the resource, size of the request, predicted popularity of the resource, and load on the second server 130.

In some implementations, the resource may be stored in a third server 140. The first server 120 may receive a first request (step 210), transmit the first request to the second server (step 220), receive a cancellation of the first request (step 250), and cancel the transmitted request (step 280). The second server 130 may receive the transmitted first request from the first server 120, send a first request to the third server 140, store an entry in the first data structure (step 230), store an entry in the second data structure (step 240), receive a cancellation of the first request from the first server 120, decrement a reference count of the referenced entry (step 260), detect that the reference count equals zero (step 270), and cancel the sent request to the third server 140 storing the resource. The second server 130 may store and maintain the first and second data structures that map or cache the transmitted requests from the first resource to the sent request to the third server 140. In some implementations, there may be one second server for a plurality of first servers. For instance, a plurality of client devices 110 may send a request for one resource to a plurality of first servers 120. The plurality of first servers 120 may transmit the requests to one common second server 130. The second server 130 may store the client device identifiers or the transmitted request identifiers, and a reference to an entry in the second data structure. The second server 130 may then send a request to the third server 140 for the resource and store one entry in the second data structure comprising the sent request identifier and a reference count. When a first server 120 receives a cancellation request from a client device 110, the first server 120 notifies the second server 130. The second server 130 deletes the entry in the first data structure, decrements the reference count of the second data structure, and checks the reference count. If the reference count is zero, the second server 130 cancels the sent request to the third server 140 and deletes the entry in the second data structure. In some implementations where the third server 140 stores the resource, the first server stores the first and second data structures, and the second server may pass along requests and responses for the resources between the first and the third servers. In some implementations where the third server 140 stores the resource, the second server stores the first and second data structures, and the first server may detect the cancellation on the user device 110.

Figure 3:
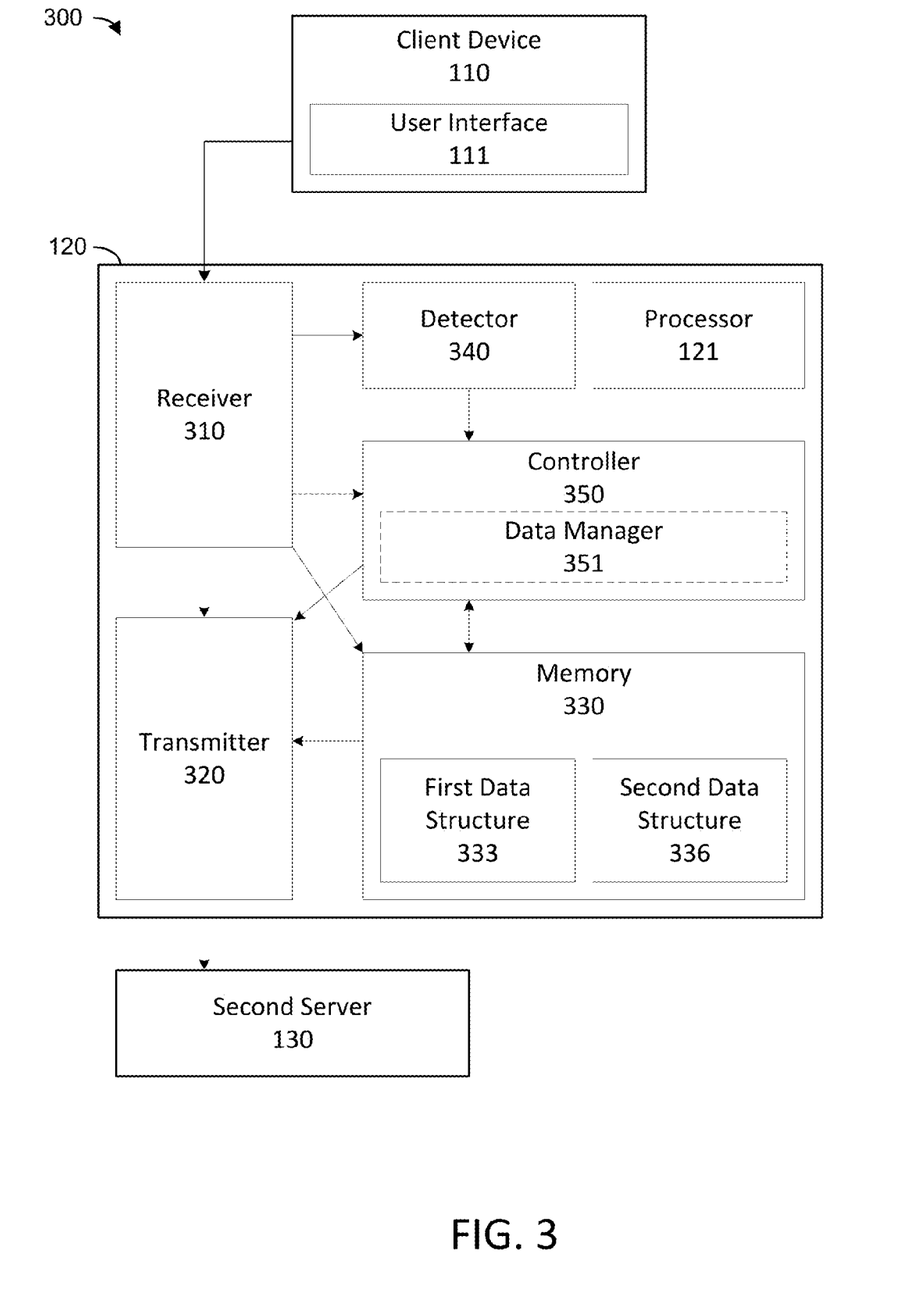
FIG. 3 is a block diagram illustrating an implementation of the first server shown in FIG. 1 in greater detail.

FIG. 3 is a block diagram illustrating an implementation of the first server 120 of FIG. 1 in greater detail, showing a receiver 310, a transmitter 320, a detector 340, a controller 350 and memory 330. The first server 120 may also comprise a processor 121. The first server 120 may also comprise a data manager 151. The data manager 351 may be a part of the controller 350. The memory 330 may store a first data structure 333 and a second data structure 336. In implementations that include a third server 140, the controller 350 and memory 330 may be stored in the second server 130.

The processor 121 may be implemented as a general purpose processor, an application specific integrated circuit (ASIC), one or more field programmable gate arrays (FPGAs), a Central Processing Unit, a Graphical Processing Unit, system on a chip unit, a group of processing components, or other suitable electronic processing components. The processor 121 may be connected directly or indirectly to the memory 330, receiver 310, transmitter 320, detector 340, and controller 350. The processor 121 may read, write, delete, or otherwise access data stored in memory 330 or other components. The processor 121 may execute instructions stored in memory 330 or other components.

The receiver 310 may be a communication interface that includes wired or wireless interfaces (e.g., jacks, antennas, transmitters, receivers, transceivers, wire terminals, Ethernet ports, WiFi transceivers, etc.) for conducting data communications with local or remote devices or systems via the network 101. For instance, the receiver 310 may allow the first server 120 to communicate with a client device 110, the second server 130, and other components of computer system 100. In some implementations, the receiver 310 may have a corresponding module or software that works in conjunction with hardware components. The receiver 310 may receive from a client device 110 a first request for a resource. The receiver 310 may also receive a cancellation of the first request from the client device 110. The receiver 310 may relay the received request to the transmitter 320, the controller 350, the memory 330, and the detector 340. In some implementations the receiver 310 may receive a response from the second server 130 and store the response in the second data structure 336 in memory 330.

The transmitter 320 may be a communication interface for conducting data communications with local or remote devices or systems via the network 101. In some implementations, the transmitter 320 uses the same hardware components as the receiver 310. The transmitter 320 may allow the first server 120 to communicate with the second server 130. For instance, the transmitter 320 may receive the first request from the receiver 310 and transmit the first request for the resource to the second server 130. In some implementations, the transmitter 320 may forward the response that is stored in the second data structure 336 in memory 330 back to the client device 110.

Memory 330 may include one or more devices (e.g., RAM, ROM, flash memory, hard disk storage, etc.) for storing data and/or computer code for completing and/or facilitating the various processes, layers, and modules described in the present disclosure. Memory 330 may include volatile memory or non-volatile memory. Memory 330 may include database components, object code components, script components, or any other type of information structure for supporting the various activities and information structures described in the present disclosure. In some implementations, memory 330 is communicably connected to processor 121 and includes computer code (e.g., data modules stored in memory 330) for executing one or more processes described herein. For instance, the detectors 340, controller 350, and data manager 351 may be stored as data modules within memory 330. The receiver 310 and the transmitter 320 may also have software components stored in memory 330. In some implementations, memory 330 stores a first data structure 333 and a second data structure 336.

Still referring to FIG. 3, memory 330 is shown to include a first data structure 333. The first data structure 333 may be a table, a map, a vector, a list, etc. An entry in the first data structure 333 may include a client device identifier or a first request identifier. The entry in the first data structure 333 may also include a reference to an entry in the second data structure 336. The reference may be an index value to the second data structure 336. In some implementations, the reference may be a pointer to the entry in the second data structure 336. The entry in the first data structure 333 may be added when a new request is received. The entry may be deleted when the request is cancelled or when the resource is received from the second server 130 and forwarded back to the client device 110.

Still referring to FIG. 3, memory 330 is shown to include a second data structure 336. The second data structure 336 may be a table, a map, a vector, a list, etc. An entry in the second data structure 336 may include a reference count. The reference count may keep track of number of entries in the first data structure 333 that reference the entry in the second data structure 336. The entry in the second data structure 336 may include a transmitted request identifier, which is the identifier of the request that the first server 120 transmitted to the second server 130. The transmitted request identifier may be associated with an asynchronous computation unit that wraps a future response from the second server 130. In some implementations, the first data structure 333 and the second data structure 336 form a multimap. In some implementations, the second data structure 336 may be a cache. The key of an entry of the second data structure 336 may be a resource identifier. The value of an entry may be the transmitted request identifier. In some implementation, the entry may also store a maximum number of reference count and a time of the response or the latest client request from the second server 130. The maximum number of reference count may be used to calculate the size of the request. The time of the response or the latest client request may be used with the freshness requirements of the resource.

The detector 340 may be a hardware component or a software module on the first server 120. In implementations where the detector 340 is a software component, the detector 340 may be stored on the memory 330 and executed by the processor 121. The detector 340 communicates with the receiver 310 and detects whether the received request is a cancellation of the first request. For instance, the detector 340 may detect that the received reload request is a cancellation of the first request. The detector 340 may also detect that a web browser on the client device 110 may have closed, stopped loading the resource, or navigated away from the resource.

The controller 350 may be a hardware component or a software module on the first server 120. In implementations where the controller 350 is a software component, the controller 350 may be stored on the memory 330 and executed by the processor 121. The controller 350 may comprise a data manager 351. The controller 350 may be connected to memory 330, receiver 310, and detector 340. The controller 350 may receive the cancellation from the detector 340. The receiver 310 may send the first request to the controller 350 so that the data manager 351 may store the first request in memory 330. The data manager 351 may decrement the reference count of an entry in the second data structure 336. The data manager 351 may also detect when the reference count equals zero. The controller 350 or the data manager 351 may cancel the transmitted request by communicating with the second server 130 through the transmitter 320. The controller 350 may determine that a transmitted request is still in progress by using the transmitted request identifier in an entry of the second data structure 336. For instance, if the entry includes or is associated with an asynchronous computation unit, the controller 350 may call a method of the asynchronous computation unit that returns whether a response has been received from the second server 130. In some implementations, the controller 350 is configured to receive a cancellation from the detector 340 and wait for a set amount of time before cancelling the transmitted request. The amount of time may be determined by the freshness requirement of the resource, size of the request, predicted popularity of the resource, and load on the second server 130. The receiver 310 may receive a second request for the resource before the expiration of the set amount of data.

In some implementations that includes a third server 140, the first server 120 may include the receiver 310, transmitter 320, and the detector 340. The second server 130 may include its own receiver 310 and transmitter 320, as well as the controller 350, data manager 351, and memory 330 that stores the first data structure 333 and the second data structure 336. The third server 140 may store the requested resource.

Figure 4:
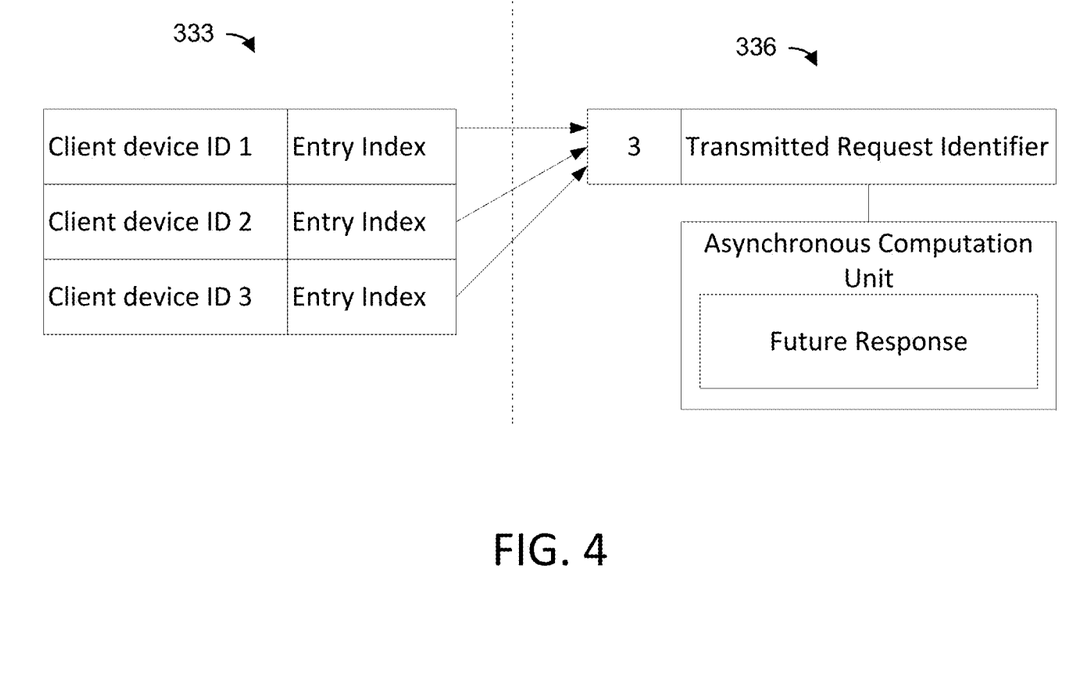
FIG. 4 is a block diagram illustrating an implementation of a first and second data structure.

FIG. 4 is a block diagram illustrating an implementation of a first and second data structure 336. The first data structure 333 may be implemented as a table. Each entry in the table may store a client device identifier and a reference to an entry in the second data structure 336. In this instance, three entries in the first data structure 333 each have different client device identifiers. The three entries reference the same entry in the second data structure 336, which indicates that the three client device 110 corresponding to the entries have all requested the same resource. The reference to the second data structure 336 is stored, in this instance, as an entry index. The shown entry in the second data structure 336 includes a reference count of "3" because three entries in the first data structure 333 are referencing the entry in the second data structure 336. The entry here includes a transmitted request identifier. In some implementations, the transmitted request identifier includes or is associated with an asynchronous computation unit. The asynchronous computation unit may include a future response that may be filled when the second server 130 returns a response to the transmitted request. The future response may also be filled with an error message indicating, for instance, that the resource could not be retrieved.

Figure 5:
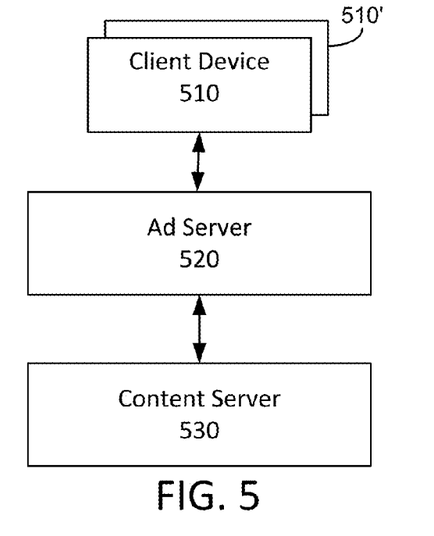
FIG. 5 is a block diagram illustrating an implementation of the present disclosure, including a client device, an ad server, and a content server.

FIG. 5 is a block diagram illustrating an implementation of the present disclosure, showing client devices 510, 510' (referred to generally as client device 510), an ad server 520, and a content server 530. The block diagram and the following description are illustrative only and are not intended to be limiting in any way. The client device 510 may be any type of client device 110 described above in relation to FIG. 1. The ad server 520 may be a first server 120 as described above in relation to FIG. 1. The content server 530 may be a second server 130 as described above in relation to FIG. 1. The client device 510 may comprise a web browser. A user may browse a web page containing an advertisement. The client device 510 may load the web page and request the advertisement from the ad server 520. There may be more than one request for the advertisement from the client device 510. As shown in FIG. 5, there may be more than one client devices 510, 510' that request the advertisement. The advertisement may be stored in the content server 530. The ad server 520 may perform the methods described in relation to FIG. 2. Specifically, the ad server 520 may transmit the first request to the content server 530, and store an entry in the first data structure and another entry in the second data structure. A user may cancel the request for the advertisement by, for instance, closing the web browser. The ad server 520 may detect that the web browser was closed. The ad server 520 may decrement a reference count associated with the entry in the second data structure. If more than one request for the advertisement is received, the ad server 520 may detect more than one cancellation of the request for the advertisement and decrement the reference count more than one times. The reference count hits zero, and in response, the ad server 520 may cancel the request for the advertisement to the content server 530 prior to receiving the advertisement from the content server 530.

Figure 6:
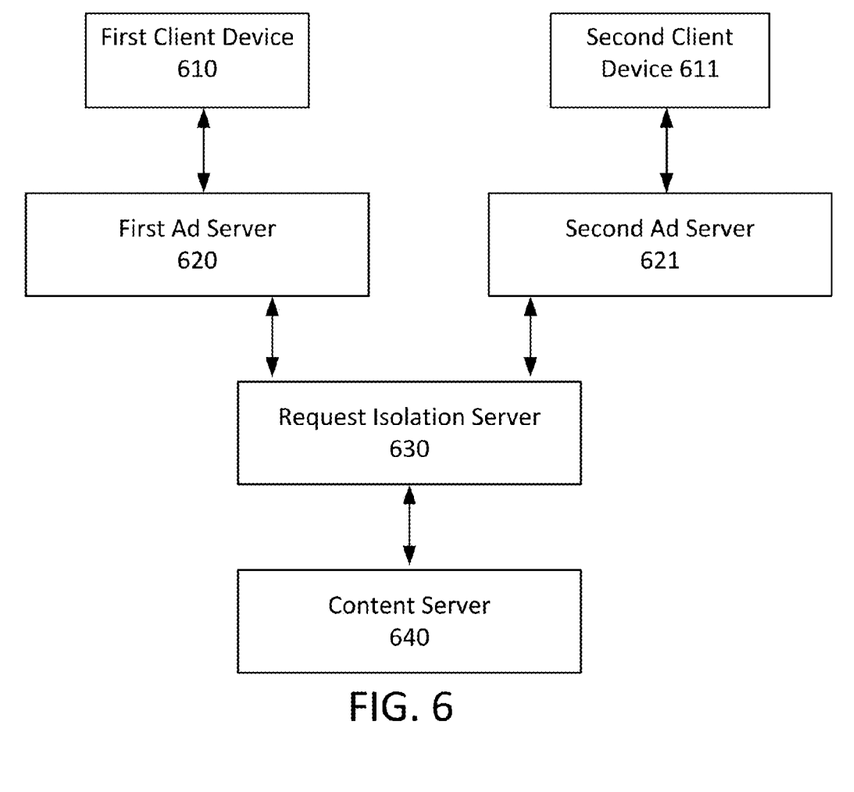
FIG. 6 is a block diagram illustrating an implementation of the present disclosure, including a first client device, a second client device, a first ad server, a second ad server, a request isolation server, and a content server.

FIG. 6 is a block diagram illustrating an implementation of the present disclosure, including a first client device 610, a second client device 611, a first ad server 620, a second ad server 621, a request isolation server 630, and a content server 640. The block diagram and the following description are illustrative only and are not intended to be limiting in any way. The first client device 510 and the second client device 511 may be any type of client device 110 described above in relation to FIG. 1. The first ad server 520 and the second ad server 621 may be first servers 120 as described above in relation to FIG. 1. The request isolation server 630 may be a second server 130 as described above in relation to FIG. 1. The content server 640 may be a third server 140 as described above in relation to FIG. 1. The first client device 610 may comprise a web browser. A user may browse a web page containing an advertisement. The first client device 610 may load the web page and request the advertisement from the first ad server 620. There may be more than one request for the advertisement from the first client device 610. There may be more than one first client device 610 that requests for the advertisement from the first ad server 620. The second client device 611 may comprise a mobile application which may request the advertisement from the second ad server 621. There may be more than one request for the advertisement from the second client device 611. There may be more than one second client device 611 that requests for the advertisement from the second ad server 621. The advertisement may be stored in the content server 640. The first ad server 620 and the second ad server 621 may perform some the methods described in relation to FIG. 2. Specifically, the first ad server 620 may transmit the first request from the first client device 610 to the request isolation server 630. The second ad server 621 may transmit another first request from the second client device 611 to the request isolation server 630. The request isolation server 630 may perform some of the methods described in relation to FIG. 2. Specifically, the request isolation server 630 may transmit one of the request to the content server 640. The request isolation server 630 may store one or more entries in the first data structure, and one entry in the second data structure. Each entry in the first data structure may correspond to, for instance, a first request for a resource from each client device. The first ad server 620 may detect a cancellation of the first request on the first client device 610, such as when the first client device 610 closes the web browser. The second ad server 621 may detect a cancellation of the other first request on the second client device 611, such as when the mobile app is closed. The first ad server 620 and the second ad server 621 transmits the cancellations to the request isolation server 630. The request isolation server 630 decrements, more than once, a reference count associated with the entry in the second data structure. The reference count hits zero, and in response, the request isolation server 630 cancels the transmitted request to the content server 640 for the advertisement.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by the first servers 120) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 110, etc.) and used by the first servers 120.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and DVD-ROM and Blu-ray disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's client device 110 in response to requests received from the web browser.

Implementations of the subject matter described in this disclosure may be implemented in a computing system that includes a backend component (e.g., as a data server), or that includes a middleware component (e.g., an application server), or that includes a frontend component (e.g., a client computer) having a graphical user interface or a web browser through which a user may interact with an implementation of the subject matter described in this disclosure, or any combination of one or more such backend, middleware, or frontend components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A computer-implemented method for request isolation protection, comprising:
   receiving, at a first server, first and second requests that are each for a resource stored in a second server, wherein the first and second requests are both sent from a client device comprising a user interface;
   transmitting, by the first server, the first and second requests for the resource to the second server;
   storing, for each of the first and second requests and in a first data structure stored in a memory element provided by the first server, an entry identifying the client device and including a reference to an entry of a second data structure;
   storing, for the first request and in the entry in the second data structure stored in the memory element, an identifier of the transmitted request and a reference count;
   identifying, based on the second request, the entry and incrementing the reference count;
   receiving, at the first server, a cancellation of the first request, the cancellation sent from the client device and submitted through the user interface;
   in response to receiving the cancellation of the first request at the first server, decrementing, by the first server, the reference count of the entry to provide an updated reference count;
   receiving, at the first server, a cancellation of the second request, the cancellation sent from the client device and submitted through the user interface;
   in response to receiving the cancellation of the second request, decrementing, by the first server, the updated reference count;
   detecting, by the first server, that the updated reference count equals zero; and
   in response to detecting the updated reference count equals zero, cancelling, by the first server, the transmitted request for the resource associated with the first and second requests.

2. The method of claim 1, wherein
   the user interface comprises a web browser, and
   wherein receiving the cancellation comprises receiving, at the first server, the cancellation of the first request, the cancellation sent from the client device and detected by the web browser.

3. The method of claim 2, wherein receiving the cancellation of the first request comprises receiving, at the first server, the cancellation of the first request, the cancellation sent from the client device and detected by the web browser detecting one of:
   the web browser closing;
   the web browser stopping a loading of the resource; and
   the web browser navigating away from the resource.

4. The method of claim 3, wherein receiving cancellation of the first request further comprises:
   receiving, at the first server, a third request for the resource, the third request sent from the client device and the web browser reloading the resource.

5. The method of claim 1, wherein cancelling the transmitted request comprises:
   cancelling the transmitted request responsive to determining that the transmitted request is still in progress.

6. The method of claim 1, further comprising:
   sending, from the second server, the transmitted request for the resource to a third server;
   cancelling, at the second server, the request for the resource from the third server, responsive to determining that the transmitted request is cancelled; and
   wherein the resource is stored in the third server and the memory element is provided by the second server.

7. The method of claim 1, wherein cancelling the transmitted request comprises:
   cancelling the transmitted request after a set amount of time.

8. The method of claim 7, wherein cancelling the transmitted request comprises:
   receiving, at the first server, a third request for the resource within a set amount of time after detecting that the second table entry has a reference count of zero, the third request sent from a second client device comprising a second user interface;

storing, in the first data structure stored in the memory element provided by the first server, a new entry identifying the second client device and including a reference to the entry of the second data structure;

receiving, at the first server, a cancellation of the third request, the cancellation sent from the second client device and detected by the second user interface;

decrementing the reference count of the second table entry;

detecting that the second table entry has a reference count of zero; and cancelling the transmitted request after a set amount of time.

9. The method of claim 7, further comprising determining the set amount of time based on one of:
   a predicted popularity of the resource;
   a freshness requirement of the resource;
   an amount of load on the second server; or
   a size of the request.

10. The method of claim 1, wherein the first data structure and the second data structure are implemented as a multimap.

11. A system for request isolation protection, comprising:
   a second server storing a resource;
   a first server, comprising:
      a receiver receiving first and second requests that are each for the resource, wherein the first and second requests are both sent from a client device comprising a user interface;
      a transmitter transmitting the first and second requests for the resource to the second server;
      a memory element storing:
         a first data structure comprising an entry, for each of the first and the second requests, identifying the client device and including a reference to an entry of a second data structure; and
         a second data structure comprising the entry, for the first request, comprising an identifier of the transmitted request, and a reference count;
      a detector receiving:
         a cancellation of the first request, the cancellation sent from the client device and submitted through the user interface;
         a cancellation of the second request, the cancellation sent from the client device and submitted through the user interface;
      a controller, connected to the memory element:
         identifying, based on the second request, the entry and incrementing the reference count;
         decrementing, in response to receiving the cancellation of the first request, the reference count of the entry in the second data structure to provide an updated reference count;
         decrementing, in response to receiving the cancellation of the second request, the updated reference count;
         detecting that the updated reference count equals zero; and
         cancelling, in response to detecting the updated reference count equals zero, the transmitted request for the resource associated with the first and second requests.

12. The system of claim 11, wherein the user interface comprises a web browser.

13. The system of claim 12, wherein the detector is further configured to receive the cancellation of the first request sent from the client device and submitted through the web browser detecting one of:
   the web browser closing;
   the web browser stopping a loading of the resource; and
   the web browser navigating away from the resource.

14. The system of claim 13, wherein the receiver is further configured to receive a third request for the resource, the third request sent from the client device and the web browser reloading the resource.

15. The system of claim 11, wherein the controller is configured to cancel the transmitted request responsive to determining that the transmitted request is still in progress.

16. The system of claim 11, further comprising:
   a third server storing the resource; and
   wherein the second server provides the memory element and is configured to request the resource from the third server, and cancel the request for the resource from the third server, responsive to determining that the transmitted request is cancelled.

17. The system of claim 11, wherein the controller is configured to cancel the transmitted request after a set amount of time.

18. The system of claim 17, wherein the receiver is further configured to
   receive a third request for the resource within a set amount of time after detecting that the second table entry has a reference count of zero, the third request sent from a second client device comprising a second user interface; and
   wherein the detector is further configured to
   receive a cancellation of the third request, the cancellation sent from the second client device and detected by the second user interface;
   wherein the memory element is further configured to store, in the first data structure, a new entry identifying the second client device and including a reference to the entry of the second data structure; and
   wherein the controller is further configured to:
   decrement the reference count of the second table entry;
   detect that the second table entry has a reference count of zero; and
   cancel the transmitted request after a set amount of time.

19. The system of claim 17, the controller is further configured to determine the set amount of time based on one of:
   a predicted popularity of the resource;
   a freshness requirement of the resource;
   an amount of load on the second server; or
   a size of the request.

20. The system of claim 11, wherein the first data structure and the second data structure are implemented as a multimap.

* * * * *